United States Patent [19]

Heinz et al.

[11] Patent Number: 5,028,689
[45] Date of Patent: Jul. 2, 1991

[54] BRANCHED (CO)POLYAMIDE BY POLYCONDENSATION IN THE PRESENCE OF LYSINE COMPONENT POLYCARBOXYLIC ACID MIXTURE

[75] Inventors: Hans-Detlef Heinz; Rolf-Volker Meyer, both of Krefeld, Fed. Rep. of Germany

[73] Assignee: Bayer Aktiengesellschaft, Leverkusen-Bayerwerk, Fed. Rep. of Germany

[21] Appl. No.: 402,617

[22] Filed: Sep. 5, 1989

[30] Foreign Application Priority Data

Sep. 17, 1988 [DE] Fed. Rep. of Germany ....... 3831709

[51] Int. Cl.$^5$ .............................................. C08G 69/10
[52] U.S. Cl. .................................. 528/328; 528/312; 528/323; 528/324; 528/329.1; 528/336; 528/480; 528/481; 528/503
[58] Field of Search ............... 528/328, 323, 324, 312, 528/329.1, 336, 480, 481, 503

[56] References Cited

FOREIGN PATENT DOCUMENTS 3912139 6/1964 Japan .................................... 528/328

*Primary Examiner*—Harold D. Anderson
*Attorney, Agent, or Firm*—Connolly & Hutz

[57] ABSTRACT

This invention relates to thermoplastically mouldable slightly branched aliphatic (co)polyamides of high molecular weight with increased melt viscosities and a marked structural viscosity prepared by accelerated polycondensation of suitable monomer melts in the presence of small quantities of lysine components and approximately equivalent quantities of a polycarboxylic acid optionally followed by a thermal after-condensation reaction, and to a process for the polycondensation. The lysine components used are lysine, lysine hydrate, esters of lysine with low alcohols or lysine hydrochlorides (the latter in the presence of approximately equivalent quantities of bases added at the same time to bind the HCl).

8 Claims, No Drawings

BRANCHED (CO)POLYAMIDE BY POLYCONDENSATION IN THE PRESENCE OF LYSINE COMPONENT POLYCARBOXYLIC ACID MIXTURE

This invention relates to thermoplastically mouldable slightly branched aliphatic (co)polyamides of high molecular weight with increased melt viscosities and a marked structural viscosity prepared by the accelerated polycondensation of suitable monomer melts in the presence of small quantities of lysine components and approximately equivalent quantities of a polycarboxylic acid optionally followed by a thermal after-condensation reaction, and to a process for the polycondensation.

Polyamides constitute a class of polymers which have been used for many years for numerous practical applications. They are prepared by various processes from widely differing polyamide-forming units and for certain special applications they may be made up into materials with special combinations of properties, either alone or in combination with e.g. processing auxiliaries, stabilizers, polymeric alloying components or mineral reinforcing materials (e.g. fillers or glass fibres).

Thus polyamides are used in large quantities for the production of fibres, moulded plastics and sheet products as well as, for example, hot melt adhesives and auxiliary agents for numerous technical applications.

Whereas lactams may be converted into polyamides cationically, hydrolytically (with the addition of water) or anionically, the polycondensation reaction is virtually the only means of preparing polyamides from polyamide-forming monomers such as diamines, dicarboxylic acids or suitable derivatives or aminocarboxylic acids (as well as lactams) (see Vieweg, Müller: Kunststoff-Handbuch, Vol. VI, pages 11 et seq, publishers Carl.Hanser-Verlag, Munich 1966).

The so-called hydrolytic polymerisation is also of greatest importance for the preparation of polyamides from lactams, e.g. the preparation of polyamide-6 from $\epsilon$-caprolactam.

Numerous procedures have become known for the preparation of polyamides These may include the choice of a variety of different monomer units to determine the nature of the matrix, different chain regulating agents for obtaining the desired average molecular weight or also the use of monomers containing "reactive" groups suitable for subsequent after-treatments (e.g. amino groups or sulphonate groups for improving the dye absorption of the fibres for acid or basic dyes), depending on the end product required Both continuous and batchwise methods of production are known, e.g. in autoclaves.

Common to all the methods for the preparation of (co)polyamides by polycondensation or by hydrolytic polymerisation of the lactams is that, starting from suitable monomer mixtures, the preparation of the (co)polyamides requires reaction times of many hours before the polyamides have sufficiently high molecular weights to enable strands to be spun from the polymer melt or for other practical applications.

No matter how long the reaction time, it is in many cases also necessary to carry out an after-condensation, e.g. in the solid phase, for obtaining even higher molecular weights. This solid phase after-condensation generally also requires considerable residence times at high temperatures, exceptionally long residence times being required for producing products with exceptionally high melt viscosities such as are required in many cases for extrusion because the reaction velocity decreases with increasing molecular weight.

The long reaction times required for the preparation of the (co)polyamides thus seriously limit the capacity of the production plants and are very expensive and energy consuming, especially as the reaction must be carried out at temperatures above 200° C., in most cases above 250° C. but always above the melting point of the products to be produced.

To achieve a substantial reduction in reaction times for the production of (co)polyamides, both those required for the polycondensation and those required for a solid phase after-condensation, without any loss of the well-known advantageous application technical properties of the products would therefore be regarded as a great and especially a cost-saving advance.

It has now surprisingly been found that the polycondensation time for the preparation of (co)polyamides from lactams and/or aminocarboxylic acids and/or diamine/dicarboxylic acid mixtures or the corresponding nylon salts or suitable PA forming derivatives may be considerably reduced by adding small quantities of lysine components and approximately equivalent quantities of a polycarboxylic acid to the polyamide-forming starting materials without previous salt formation.

Another surprising finding is that the lysine-modified polyamides obtained can be after-condensed much more rapidly than the standard types and readily give rise to products with exceptionally high melt viscosities if required.

This invention therefore relates to a process for the accelerated preparation of (co)polyamides from one or more lactams and/or aminocarboxylic acids and/or diamine/dicarboxylic acid mixtures or the corresponding nylon salts or suitable polyamide-forming derivatives by melt-polycondensation, characterised in that
 a) from 0.1 to 1.0% by weight, preferably from 0.3 to 0.9% by weight, of lysine components,
 b) an approximately equivalent of a polycarboxylic acid, preferably a dicarboxylic acid and
 c) in the case of lysine hydrochlorides, also approximately equivalent quantities of inorganic bases for binding the hydrogen chloride
are added to the monomer mixture and melt-condensation is carried out int he usual way.

The invention also relates to polyamides obtained by the process according to the invention. This solvent-free polycondensation may be followed by a process for the preparation of exceptionally high molecular weight (co)polyamides by a solid phase after-condensation of these (co)polyamides which have been modified with lysine components, this after-condensation being carried out under mild conditions, i.e. for a shorter reaction time at the same temperatures as those employed for polyamides not containing the addition of lysine-/polycarboxylic acids according to the invention or at lower reaction temperature for the same after-condensation time. The necessary time for after-condensation compared with standard products may be produced, for example, by 30 to 50% or more for obtaining partly branched, high molecular weight (co)polyamides with high melt viscosities. The solid phase after-condensation process is the subject of another invention field at the same time (see Le A 26 337/P-3 831 709.5).

Many experiments have been described for obtaining basic polyamides, especially for use as fibres with improved absorption for acid dyes, by cocondensation with polyamide-forming units containing basic groups.

Thus according to U.S. Pat. No. 3 651 023, for example, improved dye absorption of polyamide fibres and greater intensity of colour may be obtained by means of numerous different types of additives.

Lysine is also mentioned in U.S. Pat. No. 3 651 023 as one of several examples of additives to be used, but the polyamides described in Examples 1, 2 and 9 to 12 do not differ apart from the improved dyeability, characteristically from the others. In particular, the examples show that the addition of lysine either alone or in combination with a monocarboxylic acid in no way enables the reaction time to be reduced and indeed the polyamide containing, for example, 5% by weight of lysine cannot be spun because its melt viscosity is too low.

The above-mentioned Patent Specification completely fails to give any indication of the use of even approximately equivalent lysine/polycarboxylic acid mixtures.

According to the invention, a significant reduction in the reaction time can only be obtained if the lysine component and a polycarboxylic acid (preferably a dicarboxylic acid) are used in approximately equivalent quantities.

Japanese Specification 12 139/64 discloses the use of separately prepared salts of lysine and aliphatic dicarboxylic acids containing 0 to 8 methylene groups between the carboxyl groups for the preparation of high molecular weight polyamides. These are added in a quantity of from 0.5 to 5.0% by weight, preferably from 1.0 to 3.0% by weight. This process has numerous disadvantages. Firstly, the salt must be prepared in a separate step from lysine and the dicarboxylic acid, which renders the process more complicated and increases the cost. Secondly, in view of the cost of lysine and of the acid, e.g. sebacic acid, the quantity of salt used, amounting to 0.5 to 5.0% by weight, preferably 1.0 to 3.0% by weight (the examples indicating that the optimum quantity of a salt of lysine and sebacic acid would be from 1.5 to 2.0% by weight) significantly increases the cost of the end product. Furthermore, the (co)polyamides are subject to discolouration which increases with increasing proportion of lysine (derivatives) and the risk of unwanted cross-linking also increases with increasing quantities of salt so that the reproducible preparation of polyamides according to JA 12139/64 would appear to be difficult.

It was therefore completely unforeseeable and surprising that the combination of lysine components and polycarboxylic acids added to the monomer reaction mixture before the onset of the reaction without prior salt-formation would drastically increase the speed of polyamide formation and that the quantities of lysine (derivatives) and polycarboxylic acids (dicarboxylic acids) required would be much less than those described for the process according to JA 12 139/64. Furthermore, the said Japanese Specification gives no indication that the lysine/salt-modified polyamides can be after-condensed significantly more readily than standard types, especially in the solid phase.

It is also surprisingly found that the addition of a lysine component, which is a trifunctional unit, together with the polycarboxylic acids does not, as would be expected from the state of the art, result in polyamides which are cross-linked and therefore unsuitable for the preparation of moulded products.

Starting materials for polyamide formation

The lactams used for the preparation of the (co)-polyamides are ω-lactams having 5 to 13 carbon ring members, such as ε-caprolactam, oenantholactam, caprylolactam or lauryl lactam, used alone or as mixtures, preferably ε-caprolactam or lauryl lactam. ε-Caprolactam is particularly preferred.

Suitable diamines are, for example, $C_{2-20}$-alkylene diamines such as tetramethylene diamine, hexamethylene diamine, decamethylene diamine, etc. and cycloalkylene diamines such as 1,4-diaminocyclohexane, bis-(4-aminocyclohexyl)methane, 5-amino-1-aminomethyl-1,3,3-trimethylcyclohexane (isophorone diamine), etc. which are widely used in the state of the art.

Examples of suitable dicarboxylic acids include aliphatic $C_{2-38}$-dicarboxylic acids such as adipic acid, azelaic acid, dimerised fatty acids, etc.; aromatic $C_{6-14}$-dicarboxylic acids such as isophthalic acid or terephthalic acid, etc. and cycloalkylene dicarboxylic acids such as 1,3- or 1,4-cyclohexane dicarboxylic acid. Instead of using free dicarboxylic acids in the diamine/dicarboxylic acid mixtures, their esters with low boiling alcohols, for example, may be used, e.g. diethyladipate.

Examples of suitable ω-aminocarboxylic acids for the preparation of the polyamides include ω-$C_4$-$C_{18}$-aminocarboxylic acids such as aminocaproic acid, aminoundecanoic acid and aminoheptanoic acid. ε-Aminocaproic acid and ω-aminoundecanoic acid are preferred aminocarboxylic acids.

Hexamethylene diamine, tetramethylene diamine and dodecamethylene diamine are preferred diamines.

Adipic acid, azelaic acid, sebacic acid, dodecamethylene dicarboxylic acid and dimerised fatty acids are preferred dicarboxylic acids.

Preferred diamino/dicarboxylic acid mixtures or nylon salts are those obtained from hexamethylene diamine and adipic acid or sebacic acid or azelaic acid and those obtained from tetramethylene diamine and adipic acid.

The polyamide units may be used as virtually any mixtures although it is preferred to use aliphatic polyamides or polyamides containing only a minor proportion (<50% by weight) of aromatic units.

Lysine components

Lysine hydrate or esters of lower ($C_1$-$C_4$) alcohols such as lysine methyl ester may be used as well as lysine (2,6-diaminohexanoic acid). Lysine hydrate and aqueous solutions of lysine are preferably used.

Lysine mono- or dihydrochlorides or the mono- or dihydrochlorides of lysine esters may also be used.

When hydrochlorides are used, approximately equivalent quantities of (inorganic) bases must be added for neutralisation (i.e. one equivalent of base in the case of monohydrochlorides and two equivalents in the case of dihydrochlorides).

The alcohol components used in monohydrochlorides and dihydrochlorides of lysine esters may in particular be low boiling alcohols such as methanol, ethanol or optionally tert.-butanol. Preferred lysine hydrochlorides are L-lysine dihydrochloride, DL-lysine monohydrochloride and L-lysine monohydrochloride. L-Lysine monohydrochloride is particularly preferred. L-lysine monohydrochloride is produced on a large industrial scale, e.g. by fermentation processes (see Ullmanns Encylcopädie der technischen Chemie, 4th new revised and extended Edition, Volume 7, Verlag Chemie, Weinheim/Bergstrasse, 1974).

The individual optical antipodes of lysine may be used as lysine components or any mixtures thereof, e.g. the racemate.

Examples of inorganic bases used in the accelerator combination according to the invention include oxides, hydroxides and carbonates of various metals, e.g. sodium hydroxide, potassium hydroxide, sodium carbonate, potassium carbonate, magnesium hydroxide, magnesium carbonate, calcium hydroxide, sodium oxide, copper hydroxide, copper carbonate, calcium carbonate, manganese hydroxide, manganese carbonate, etc.. Sodium hydroxide, potassium hydroxide, sodium carbonate and potassium carbonate are preferred inorganic bases. Sodium hydroxide and potassium hydroxide are particularly preferred.

The lysine/polycarboxylic acid components may be added separately or together but they are always preferably added directly to the reaction mixture before or during onset of the reaction of polyamide formation (without previous preparation of a salt). In the case of hydrochlorides, the bases may be incorporated at the same time as the hydrochlorides.

The quantity of lysine components to be used corresponds to 0.1 to 1.0% by weight, preferably from 0.3 to 0.9% by weight, of lysine segments in the (co)polyamide and the approximately equivalent quantity of a polycarboxylic acid. The equivalent quantity is calculated only on the basis of the second (i.e. free) amino group of the lysine components. (In lysine, for example, one amino group is used up for salt formation by the carboxyl function). The lysine segment is the segment corresponding to the following formula:

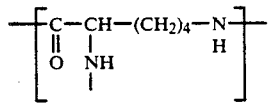

The quantities of lysine components to be used may easily be calculated from the quantity of lysine segments contained therein.

The polycarboxylic acids to be used in quantities approximately equivalent to the lysine are also preferably selected from the above-mentioned acids although a proportion of higher functional carboxylic acids may also be used, e.g. tricarboxylic acids or tetracarboxylic acids.

Relatively long chained aliphatic dicarboxylic acids $HOOC(CH_2)_m \cdot COOH$ in which $m \leq 4$ methylene groups and cycloaliphatic dicarboxylic acids such as 1,3- or 1,4-cyclohexane dicarboxylic acid are particularly preferred, as well as (although less preferred) aromatic dicarboxylic acids such as isophthalic acid or terephthalic acid or mixtures thereof.

The acceleration of the reaction by the addition of lysine/polycarboxylic acid may also advantageously be utilized for carrying out the polyamide synthesis at a lower temperature. In the case of the preparation of polyamide-6 from ε-caprolactam, for example, this leads to higher polyamide yields or, and due to the lower temperature, it results in lower monomer/oligomer extracts of the lysine-containing (co)polyamide.

The polycondensation reaction mixture may also contain stabilizers such as, for example, metal salts (e.g. Cu or Mn salts) and sterically hindered phenols or amines.

The reaction mixture may also contain additives such as nucleating agents, pigments, lubricants, dyes, carbon black, etc.

Monocarboxylic acids may also be present in the usual quantities as chain terminating agents.

The polycondensation may be carried out continuously or batchwise.

The polyamides obtained according to the invention may be discharged from the melt in known manner, preferably into water bath, and chopped up, optionally extracted, and dried.

The above-mentioned additives and stabilizers, glass fibres or other reinforcing fibres, reinforcing materials such a kaolin or some of the many impact strength modifiers known in the art may be added to the polyamides.

Moulded products, fibres, sheet products and other articles may be produced thermoplastically from the polyamides in known manner.

The process according to the invention can be used preferably to prepare concentrates (master batches) on the basis of polycaprolactam or other polyamides, such as dyestuff-, pigment-, stabilizer-, demoulding compounds-, matting compounds or nucleating-concentrates or other concentrates.

These master batches are prepared in the presence of relatively high concentrations (for example, up to 40% by weight or even 60% by weight), of dyestuffs, pigments, stabilizers, demoulding agents, matting substances or nucleating substances or other usual additives during the preparation of the polyamides according to the invention.

A preferred object of the invention are such master batches, prepared according to the process of the invention especially on the basis of caprolactam as the main polyamide-forming component.

A further object of the invention are also thermoplastic polymers, which were modified with such master batches by melt-mixing and the materials prepared therefrom, such as mouldings, foils and fibre or other products.

For example, a 30% $TiO_2$-masterbatch based on lysine-modified caprolactam can be made in a drastically shortened reaction time (half the time compared with a normal polyamide-6-masterbatch). This concentrate may be used advantageously for the preparation of fibres.

In the same manner dyestuff or (organic) pigment concentrates for polyamide mouldings can be prepared. The new process for the preparation of such masterbatches is of great advantage, since the thermal treatment of the dyestuffs/pigments or other additives at the high polycondensation temperatures are drastically reduced.

It is in some cases particularly advantageous to subject the polyamides containing the addition of lysine/polycarboxylic acid to a solid phase after-condensation. The polyamides preferred for this purpose are PA-6 and 66 and 6/66 copolyamides, which give rise by a surprisingly rapid reaction (i.e. short after-condensation time) to high molecular weight polyamides which have a high melt viscosity and advantageous mechanical properties as disclosed in copending U.S. application Ser. No. 402,886, filed Sept. 1, 1989.

For the after-condensation, polyamide granulate is heated for the desired time in a vacuum or under an inert gas (stream) at a temperature range of from 140 to 250° C., preferably from 160 to 230° C., but in any case at least 10 degrees Centigrade, preferably at least 20 degrees Centigrade below the melting point of the given polyamide. The longer the time chosen for the after-condensation, the higher are the molecular weights obtained.

The solid phase after-condensation may be carried out batch-wise, e.g. in a tumble drier or spiral mixer, or continuously. The inert gas used is preferably nitrogen. The after-condensation times are suitably in the range of 0.5 to 30 hours, preferably 1.0 to 20 hours. The longer reaction times are preferably chosen for lower temperatures and vice versa.

Lysine-containing (co)polyamides with very high melt viscosities and a marked structural viscosity may also be prepared by solid phase after-condensation. These types of (co)polyamides are particularly suitable for extrusion and blow moulding processes. Products with a very high melt viscosity are in particular those having melt viscosities above 1200 Pa.s/270° C. and a shear gradient of about 1 s$^{-1}$. The products in most cases have a marked structural viscosity and are therefore probably slightly branched.

The preferred (co)polyamide for this purpose according to the invention are polyamide-6 or polyamides which are rich in caprolactam units.

Compared with products which are free from lysine, these (co)polyamides may have a higher $n_{rel}$ value and especially a higher melt viscosity under the same reaction conditions. They have a marked structural viscosity. This flow property indicates a slightly branched structure. These (co)polyamides may also readily be after-condensed to products with a high melt viscosity. They have substantially the same combination of properties as comparison products but may be prepared more economically and more rapidly.

The examples which follow illustrate the invention without limiting it.

EXAMPLES

EXAMPLES 1-3

92.5 g of ε-Caprolactam, 9.4 g of aminocaproic acid, 0.66 g of lysine hydrate and 0.38 g of azelaic acid were weighed into a 250 ml round bottomed flask. After the atmosphere had been made inert by means of nitrogen, the reaction mixture was heated to 200° C. with stirring and maintained at this temperature for one hour. It was then heated to 270° C. and polycondensed with slow stirring. The flasks were removed and smashed when the polymer was cold. The polymer was then chopped up and extracted with water.

The reaction times and the solution viscosities and melt viscosities are summarized in Table 1.

Comparison Examples 1-3

Polyamide-6 was polycondensed in a similar manner but without the addition according to the invention of lysine/ polycarboxylic acid. The data are entered in Table 1.

EXAMPLES 4-6

A copolyamide consisting of about 92 mol-% of caprolactam and about 8 mol-% of AH salt (salt of adipic acid and hexamethylenediamine) was prepared with the addition of 0.66 g of lysine hydrate and 0.38 g of azelaic acid as described for Examples 1-3.

The data are entered in Table 1.

Comparison Examples 4-6

Another copolyamide was prepared by the same method but without the addition of lysine hydrate/azelaic acid.

The data are entered in Table 1.

TABLE 1

| Example No. | Time at 270° C. (h) | $n_{rel}$* | MV** 1 s$^{-1}$ | 10 s$^{-1}$ |
|---|---|---|---|---|
| 1 | 1 | 2.5 | — | 105 |
| 2 | 3 | 3.4 | 900 | 660 |
| 3 | 6 | 3.9 | 2800 | about 1300 |
| Comparison |  |  |  |  |
| 1 | 1 | 2.3 | — | 56 |
| 2 | 3 | 3.1 | 200 | 190 |
| 3 | 6 | 4.1 | 1200 | 1000 |
| 4 | 2 | 3.0 | 580 | 470 |
| 5 | 3 | 3.3 | 1400 | 830 |
| 6 | 4 | 3.3 | 2100 | 970 |
| Comparison |  |  |  |  |
| 4 | 2 | 2.5 | 300 | 270 |
| 5 | 3 | 3.1 | 440 | 400 |
| 6 | 4 | 3.3 | 510 | 440 |

*$n_{rel}$ denotes the relative solution viscosity of a 1% by weight solution in m-cresol at 25° C.
**MV denotes the melt viscosity at 270° C.
1 s$^{-1}$ denotes the shear gradient 1
10 s$^{-1}$ denotes the shear gradient 10.

EXAMPLES 7-11

PA 6 was prepared as described for Examples 1 to 3 from 81.5 g of caprolactam and 9.4 g of aminocaproic acid, using different quantities of lysine hydrate/azelaic acid. Polycondensation was carried out for 3 hours at 270° C.

The data are entered in Table 2.

Similar results are obtained if instead of azelaic acid, equivalent quantities of adipic acid, sebacic acid or dodecane dicarboxylic acid are used.

Comparison Examples 7-8

A polyamide 6 was prepared by the same method but without the addition according to the invention. The data are entered in Table 2.

TABLE 2

| Example No. | Quantity (g) of lysine hydrate/AzS | $n_{rel}$ | MV 1 s | 10 s |
|---|---|---|---|---|
| 7 | 0.33/0.19 | 3.0 | 560 | 490 |
| 8 | 0.99/0.56 | 3.3 | 1650 | — |
| Comparison 7 | — | 3.0 | 270 | 260 |
| 9 | 0.16/0.094 | 3.0 | 410 | 390 |
| 10 | 0.49/0.28 | 3.2 | 1000 | 750 |
| 11 | 1.31/0.75 | 3.7 | 1800 | 800 |
| Comparison 8 | — | 2.7 | — | 105 |

EXAMPLES 12-15

Various 6/66 copolyamides were prepared with 0.66 g of lysine hydrate and 0.38 g of azelaic acid as described for Examples 4 to 6.

The data are entered in Table 3.

Comparison Examples 9-12

The same copolyamides as those prepared in Examples 12-15 were prepared in these examples but without the addition according to the invention. The data are entered in Table 3.

TABLE 3

| Example No. | PA6/66 (appr.) | CL | AH salt (g) | Time at 270° C. (h) | $n_{rel}$ | MV* (270° C.) |
|---|---|---|---|---|---|---|
| 12 | 82/18 | 80 | 20 | 2 | 2.8 | 180 |
| 13 | 75/25 | 75 | 29 | 0.8 | 3.2 | — |
| 14 | 15/85 | 15 | 98.5 | 1 | 4.9 | — |
| 15 | 15/85 | 15 | 98.5 | 2 | 5.1 | — |
| Comparison 9 | 82/18 | 80 | 20 | 2 | 2.6 | 100 |
| Comparison 10 | 75/25 | 75 | 29 | 0.8 | 2.7 | — |
| Comparison 11 | 15/85 | 15 | 98.5 | 1 | 3.2 | — |
| Comparison 12 | 15/85 | 15 | 98.5 | 2 | 3.2 | — |

* = Melt viscosity in Pa.s (at the given temperature) and (in this case) a shear gradient of $1-10 \ s^{-1}$.

EXAMPLE 16

This example demonstrates the accelerated preparation of a polyamide 610.

41.1 g of Hexamethylene diamine, 71.6 g of sebacic acid, 0.65 g of lysine hydrate and 0.37 g of azelaic acid were introduced into a 250 ml round bottomed flask and after replacement of the air by nitrogen the mixture was heated to 200° C. for one hour. The temperature was then raised to 270° C. and polycondensation was carried out for one hour. The PA 610 obtained had a high melt viscosity and an $n_{rel}$ value of 4.1.

Comparison Example 13

A polyamide 610 was prepared by the same method but without the addition according to the invention. The melt viscosity was low and the $n_{rel}$-value was 2.6.

EXAMPLES 17-18

Polyamide 6 granulate prepared according to Examples 1 to 3 was after-condensed for 3 and 7 hours at 170° C. in a stream of nitrogen (40 l of $N_2$ per hour) in a round bottomed flask which was rotated at 50 revs/min.

The data are entered in Table 4.

Comparison Example 14

A polyamide 6 granulate which had a relative viscosity of 2.9 and had not been modified with lysine was after-condensed by the same method for 7 hours.

The data are entered in Table 4.

TABLE 4

| Example No. | Solid phase after-condensation at 170° C. in hours | $n_{rel}$ | MV (250° C. $1 \ s^{-1}$) |
|---|---|---|---|
| according to Ex. 1) | | | |
| Starting material* | 0 | 2.8 | about 400 |
| 17 | 3 | 3.3 | 1700 |
| 18 | 7 | 3.9 | 2900 |
| Starting material | 0 | 2.9 | about 190 |
| Comparison 14 | 7 | 3.2 | about 480 |

The starting material was prepared as in Example 1 and polycondensed for 120 minutes at 270° C. As the examples show, the addition according to the invention of lysine (derivatives)/polycarboxylic acids results in high molecular weight polyamides within a much shorter time than that required without this addition which accelerates both the polycondensation of the solvent-free melt and the solid phase after-condensation.

EXAMPLE 19

81.5 g of caprolactam, 9.4 g of aminocaproic acid, 0.65 g of L-lysine monohydrochloride, 0.34 g of azelaic acid and 1.44 g of 10% aqueous NaOH were weighed into a 250 ml round bottomed flask. After the atmosphere had been rendered inert with N2. the reaction mixture was heated to 200° C. with stirring and maintained at this temperature for one hour. The temperature was then raised to 270° C. and polycondensation was carried out for 3 hours with slow stirring. The flask was removed and broken up when the polymer was cold. The polymer was chopped up and extracted with methanol for 24 hours. The data are summarized in Table 5.

Comparison Example 15

A PA 6 sample was prepared by the same method but without addition of any of the accelerator combination. The data are summarized in Table 5.

EXAMPLE 20

A PA 6 sample was prepared by the method of Example 19 with the addition of 0.72 g of L-lysine monohydrochloride, 0.38 g of azelaic acid and 1.6 g of 10% aqueous NaOH. The polycondensation time was 2 hours. The data are entered in Table 5.

Comparison Example 16

A PA 6 sample was prepared by the same method but without addition of any of the accelerator combination. The data are summarized in Table 5.

EXAMPLE 21

A 6/66 copolyamide was prepared by the method described for Examples 19 and 20 from 80 g of caprolactam and 23.2 g of AH salt (about 75/25 6/66 copolyamide). 0.72 g of L-lysine monohydrochloride, 0.37 g of azelaic acid and 1.6 g of 10% aqueous NaOH were added to accelerate the reaction. The polycondensation time at 270° C. was 3 hours.

The data are entered in Table 5.

Comparison Example 17

A copolyamide was prepared by the same method but without accelerator. The data are entered in Table 5.

EXAMPLE 22

A 6/66 copolyamide was prepared from 15 g of caprolactam and 98.5 g of AH salt (15/85 6/66 copolyamide) by the method described for Examples 19 and 20. The same quantities of combination as used in Example 21 were added for accelerating the reaction. The data are entered in Table 5.

Comparison Example 18

Example 22 was repeated without addition of the accelerator combination. The data are entered in Table 5. (PA=polyamide, Ex=Example No., cmp.=Comparison Example).

TABLE 5

| Example | Type of PA | Time at 270° C. (h) | $n_{rel}$ | MV at 270° C.[1] (Pas) |
|---|---|---|---|---|
| 19 | 6 | 3 | 3.2 | 625 |
| cmp. 15 | 6 | 3 | 3.3 | 250 |
| 20 | 6 | 2 | 3.1 | 300 |
| cmp. 16 | 6 | 2 | 2.9 | about 100 |
| 21 | about 75/25 of 6/66 coPA | 3 | 3.8 | |
| cmp. 17 | about 75/25 of 6/66 coPA | 3 | 3.3 | |
| 22 | 15/85 of 6/66 coPA | 2 | 3.9 | 7000 |
| cmp. 18 | 15/85 of 6/66 coPA | 2 | 3.2 | 300 |

[1] melt viscosity at a shear gradient of 0.3-3 $s^{-1}$.

EXAMPLE 23

10 kg of Caprolactam, 1 kg of water, 71.3 g of L-lysine monohydrochloride, 27 g of adipic acid and 15.6 g of NaOH were weighed into a 25 l autoclave and heated to 200° C. under their own pressure for one hour after the atmosphere had been rendered inert. The pressure was then released to atmospheric pressure and at the same time the reaction mixture was heated to 270° C. The build-up of melt viscosity was determined from the speed of rotation of a stirrer rotating under a constant force. The desired melt viscosity was reached after about 1.5 hours at 270° C. The stirrer was switched off and the polyamide was left to settle for one hour and then forced out of the tank with $N_2$. The strands were transferred to a chopping machine through a water bath and extracted with water and dried. The product had a relative viscosity of 2.9.

In a comparison experiment carried out without the addition of accelerator, about twice the length of time was required for reaching the same melt viscosity.

EXAMPLE 24

About 50 g of the PA 6 granulate obtained according to Example 23 were after-condensed in the solid phase for 7 hours in a rotary evaporator rotating at 50 revs/min in a stream of nitrogen of 40 l per hour at 170° C. The results are summarized in Table 6.

Comparison Example 19

Unmodified PA 6 granulate having the same solution viscosity was after-condensed by the same method. The data are summarized in Table 6.

TABLE 6

| Example | Time at 170° C. (h) | $n_{rel}$ | MV at 250° C. (Pas) (2,26 $s^{-1}$) |
|---|---|---|---|
| 24 | 7 | 3.2 | 1325 |
| Starting material = Ex. 23 | — | 2.9 | 300 |
| cmp. 19 | 7 | 3.2 | about 480 |
| Starting material | — | 2.9 | about 190 |

As the Examples show, the reaction time required for reaching a desired melt viscosity may be considerably reduced or products of a higher melt viscosity may be prepared within the same time by using the accelerator combination according to the invention.

What is claimed is:

1. A process for the accelerated preparation of a branched polyamide comprising polycondensing a monomer mixture, the monomer mixture comprising he following components;
   1) one or more lactams, aminocarboxylic acids, diamine/dicarboxylic acid mixtures, or mixtures thereof or of the salts or polyamide-forming derivatives thereof;
   2) a lysine component selected from the group consisting of lysine, lysine hydrate, a lysine ester of a lower alcohol, and a lysine hydrochloride, as pure enantiomers or as any mixture of entantiomers, the lysine component being present in such quantity that the (co)polyamide contains from 0.1 to 1.0% by weight of units from the lysine components; and
   3) a polycarboxylic acid in an amount approximately equivalent in quantity to the free amino group of the lysine component, the lysine component and polycarboxylic acid being added to the monomer mixture without previous salt formation, before or on the onset of the reaction, and polycondensing at a temperature up to 270° C.

2. A process as claimed in 1 wherein the lysine component is lysine hydrate or an aqueous solution of lysine.

3. A process as claimed in claim 1, wherein component 1) of the monomer mixture is ε- caprolactam or a mixture thereof with other polyamide-forming compounds.

4. A process as claimed in claim 1, wherein the lysine component is included in a quantity such that the polyamide contains from 0.3 to 0.9% by weight of units from the lysine component.

5. A process as claimed in claim 1, wherein the polycondensation is carried out in the presence of a dyestuff, pigment, stabilizer, demoulding compound, matting compound or nucleating compound.

6. A process as claimed in claim 1, wherein the polycarboxylic acid is a dicarboxylic acid.

7. A process as claimed in claim 6, wherein the lysine component is a lysine hydrochloride, and wherein the monomer mixture additionally comprises an inorganic base in a quantity approximately equivalent to the amount of hydrochloride.

8. A process as claimed din claim 7, wherein the inorganic base is selected from sodium hydroxide, potassium hydroxide, potassium (bi)carbonate or sodium (bi)carbonate.

* * * * *